(12) United States Patent
Wipplinger et al.

(10) Patent No.: US 8,271,150 B2
(45) Date of Patent: Sep. 18, 2012

(54) METHODS AND SYSTEMS FOR DISPLAYING ENROUTE MOVING MAPS

(75) Inventors: Patrick Wipplinger, Moerfelden-Walldorf (DE); Jens Schiefele, Hessen (DE); Thorsten Wiesemann, Hessen (DE)

(73) Assignee: The Boeing Company, Chicago, IL (US)

( * ) Notice: Subject to any disclaimer, the term of this patent is extended or adjusted under 35 U.S.C. 154(b) by 506 days.

(21) Appl. No.: 11/533,202

(22) Filed: Sep. 19, 2006

(65) Prior Publication Data

US 2007/0150124 A1    Jun. 28, 2007

Related U.S. Application Data

(60) Provisional application No. 60/753,297, filed on Dec. 22, 2005.

(51) Int. Cl.
  *G05D 1/00*        (2006.01)
  *G01C 21/00*       (2006.01)
(52) U.S. Cl. ............................. 701/3; 701/400; 701/431
(58) Field of Classification Search .................... 701/11, 701/3; 340/995.26; 283/66.1
See application file for complete search history.

(56) References Cited

U.S. PATENT DOCUMENTS

| | | | | |
|---|---|---|---|---|
| 4,642,775 A | * | 2/1987 | Cline et al. | 701/528 |
| 5,519,392 A | | 5/1996 | Oder | |
| 5,978,715 A | * | 11/1999 | Briffe et al. | 701/11 |
| 6,038,498 A | * | 3/2000 | Briffe et al. | 701/3 |
| 6,112,141 A | * | 8/2000 | Briffe et al. | 701/14 |
| 6,247,019 B1 | * | 6/2001 | Davies | 340/989 |
| 6,597,294 B1 | * | 7/2003 | Ariens | 340/995.26 |
| 6,745,115 B1 | * | 6/2004 | Chen et al. | 701/9 |
| 6,826,458 B2 | * | 11/2004 | Horvath et al. | 701/3 |
| 6,922,631 B1 | * | 7/2005 | Dwyer et al. | 701/528 |
| 6,985,091 B2 | * | 1/2006 | Price | 340/975 |
| 7,124,000 B2 | * | 10/2006 | Horvath et al. | 701/3 |
| 7,256,710 B2 | * | 8/2007 | Mumaw et al. | 340/973 |
| 7,268,702 B2 | * | 9/2007 | Chamas et al. | 340/975 |
| 7,295,135 B2 | * | 11/2007 | Younkin | 340/971 |
| 7,305,286 B1 | * | 12/2007 | Younkin et al. | 701/7 |
| 7,321,318 B2 | * | 1/2008 | Crane et al. | 340/971 |

(Continued)

FOREIGN PATENT DOCUMENTS

EP    1243895 A2    9/2002

OTHER PUBLICATIONS

International Search Report for Internal Application No. PCT/US2006/047315; Jun. 27, 2007; 13 pages.

(Continued)

*Primary Examiner* — Ian Jen
(74) *Attorney, Agent, or Firm* — Armstrong Teasdale LLP

(57) ABSTRACT

Methods and systems for a position indicating display system for an aircraft are provided. The system includes a moving map display representative of an area being traversed by the aircraft such that a current relative position of the aircraft is maintained proximate a center of the display, a first overlay on the moving map display that is indicative of a predetermined track of travel, and a second overlay on the moving map display indicative of a distance range from a suitable alternate airport. The second overlay also displays equal time points to assist flight crews in determining closest suitable alternate airport in the event of a required diversion. Constraints regarding the intended flight route on the organized track system are available for display to the flight crew.

22 Claims, 4 Drawing Sheets

U.S. PATENT DOCUMENTS

| | | | |
|---|---|---|---|
| 7,352,292 B2* | 4/2008 | Alter et al. | 340/945 |
| 2002/0140578 A1* | 10/2002 | Price | 340/971 |
| 2003/0003872 A1* | 1/2003 | Brinkley et al. | 455/66 |
| 2003/0060940 A1* | 3/2003 | Humbard et al. | 701/3 |
| 2003/0193411 A1* | 10/2003 | Price | 340/973 |
| 2004/0225432 A1* | 11/2004 | Pilley et al. | 701/117 |
| 2006/0028012 A1* | 2/2006 | Holder et al. | 283/66.1 |
| 2006/0164261 A1* | 7/2006 | Stiffler | 340/945 |
| 2007/0115938 A1* | 5/2007 | Conzachi et al. | 370/352 |
| 2007/0127460 A1* | 6/2007 | Wilber et al. | 370/389 |

OTHER PUBLICATIONS

Garmin; MX20 Color Multi-Function Display Pilot's Guide; Garmin Ltd.; Oct. 2005; 75 pages.

Fitzsimmons, F.; The Electronic Flight Bag: A Multi-Function Tool for the Modern Cockpit; IITA Research Publication 2; Aug. 2002; 33 pages.

Moore, P.E.; British Airways Etops Flight Planning System; Journal of Navigation Royal Institute of Navigation; May 1993; 8 pp.; vol. 46, No. 2.

\* cited by examiner

METHODS AND SYSTEMS FOR DISPLAYING ENROUTE MOVING MAPS

CROSS REFERENCE TO RELATED APPLICATIONS

This application claims priority to U.S. Provisional Patent Application Ser. No. 60/753,297 filed Dec. 22, 2005, the contents of which are hereby incorporated by reference.

BACKGROUND OF THE INVENTION

This invention relates generally to aircraft cockpit displays and more particularly, to methods and systems for displaying moving maps on aircraft cockpit displays.

At least some known aircraft include cockpit displays that are controlled by an information system such as an electronic flight bag. The electronic flight bag is a relatively new feature for managing information in an aircraft. A traditional paper-based flight bag may provide access, in paper form to such aids as enroute charts, departure procedures, engine out procedures, standard terminal arrivals (STARS), approach plates, taxi diagrams, extended twin engine operations (ETOPS) and oceanic navigational logs, and planning charts. The flight bag also generally includes operations manual, flight manual, MEL/CDL, fault reporting manual, performance data, checklists, and operations specifications. However, a transition from paper requires that the currently accessible paper based operational cockpit procedures be built into the newly added Electronic Flight Bag (EFB) functionality. On North Atlantic routes, the information is supplied using paper media for North Atlantic Tracks (NATracks) during times of high traffic crossing the Atlantic that define the flight path over the North Atlantic. NATracks are members of an organized track system (OTS). NAT-OTS tracks change daily. During travel along NATracks, twin engine operated aircraft have a limited amount time to reach an alternate airport in case of an off normal procedure such as loss of an engine (ETOPS). During ETOPS operation, the alternate airport is determined manually from paper charts and the determination is subject to error in determining the flights conditions to the airport.

BRIEF DESCRIPTION OF THE INVENTION

In one embodiment, a system for a position indicating display system for an aircraft includes a moving map display representative of an area being traversed by the aircraft such that a current relative position of the aircraft is maintained within a margin of the screen of the display system, a first overlay on the moving map display that is indicative of a predetermined track of travel, and a second overlay on the moving map display indicative of a distance range of travel of the aircraft at a current rate of travel from the current position for a predetermined time period, said second overlay circumscribing the current position of the aircraft.

In another embodiment, a method of displaying a current position of an aircraft includes determining a current position of the aircraft, displaying a moving map of an area of earth surface surrounding the determined current position of the aircraft wherein a size of the area is selectable by a user, displaying a predetermined track of intended travel across the area, and displaying a graticule indicative of a distance of travel at a current speed of the aircraft for a predetermined time.

In yet another embodiment, an electronic flight bag system including a moving map display includes a first overlay displayed on the moving map display indicative of an intended track of travel, and a second overlay displayed on the moving map display indicative of a current position of the aircraft with respect to a position of a facility capable of receiving the aircraft.

DETAILED DESCRIPTION OF THE INVENTION

Figure 1:
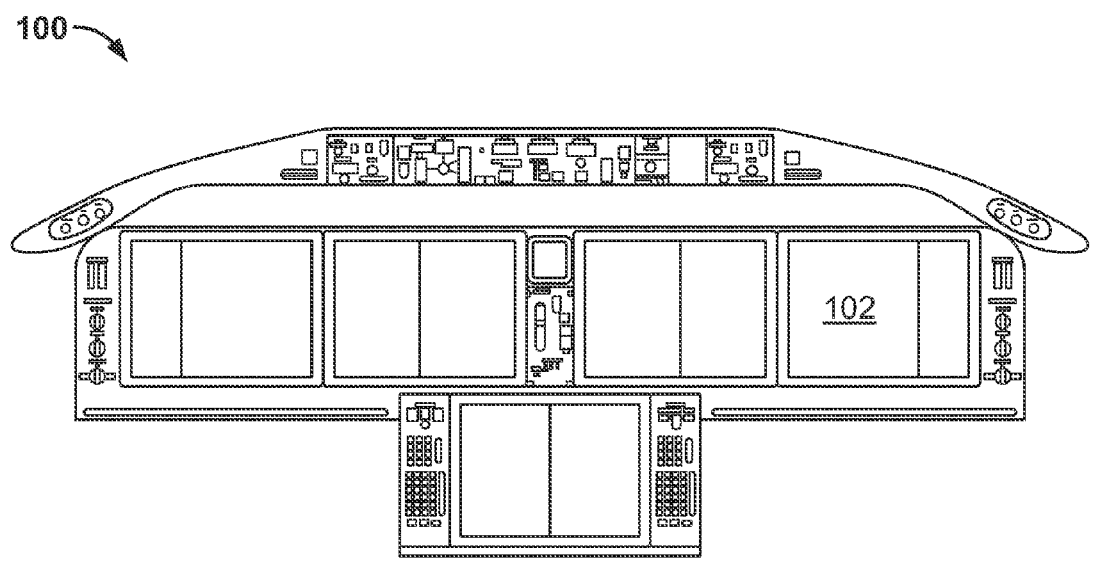
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag (not shown), which may be embodied as a standalone device such as, but not limited to a PDA or laptop PC, or as a software component of a system executing on a processor that is part of a subsystem of the aircraft. In the exemplary embodiment, the electronic flight bag includes an electronic storage device configured to store various user-configurable flight-related objects for all required and desired information for a particular flight, such as flight routes, as defined by way-points, airport information, temporary flight restrictions, and weather information as well as any other user-defined objects associated with a flight, ground operations, and/or flight planning. The electronic flight bag receives data from various aircraft and ground sensors and systems, determines flight information based on the received data in real-time, and displays the flight information and/or alerts the flight crew through display screen 102 and other aural and/or visual indicators positioned on cockpit display panel 100. Such flight information provides the flight crew with additional situational awareness during all phases of aircraft operation.

Figure 2:
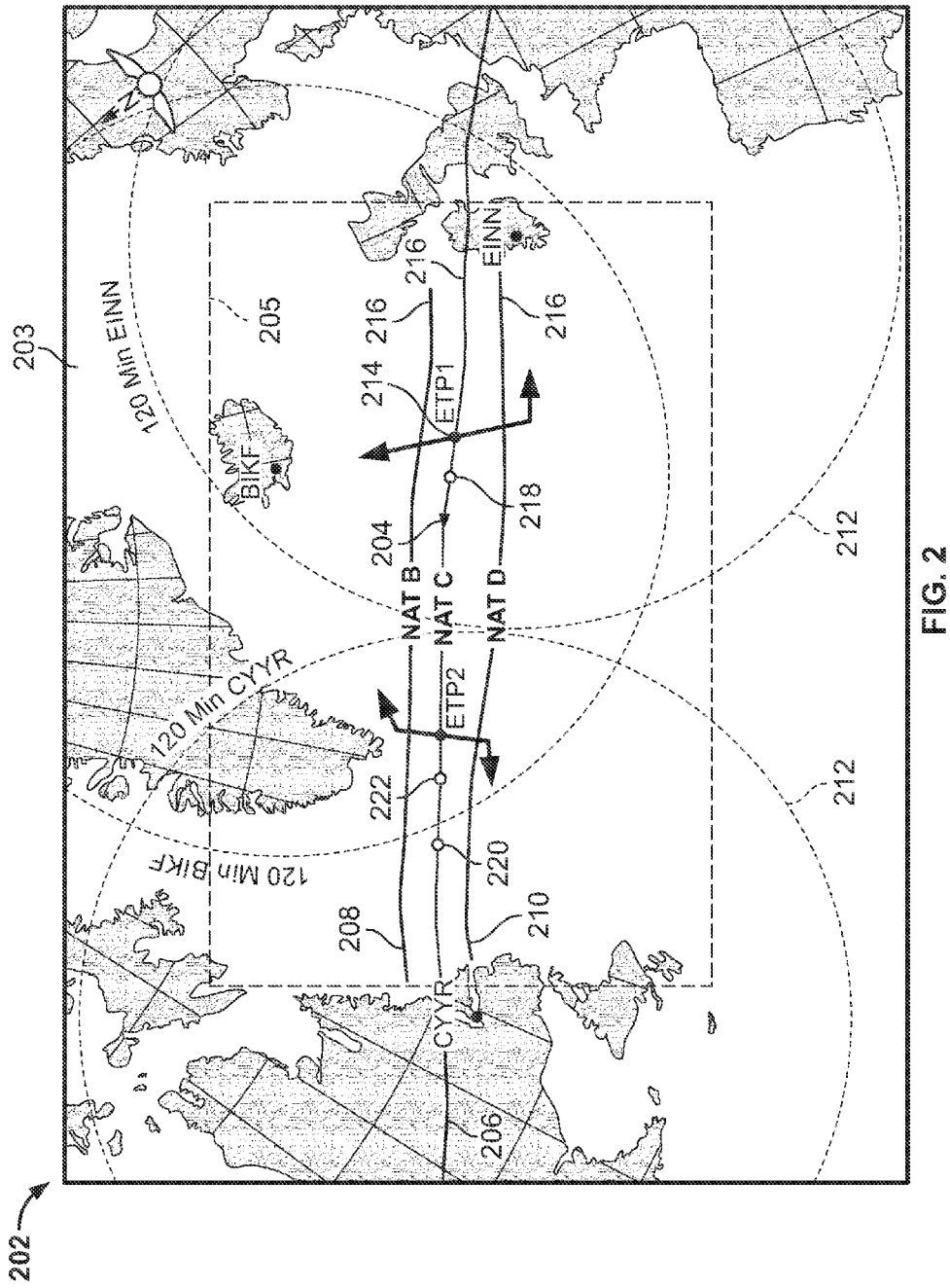
FIG. 2 is a screen shot depicting an exemplary position indicating display system that may be used with the aircraft cockpit display panel shown in FIG. 1.

FIG. 2 is a screen shot 200 depicting an exemplary position indicating display system 202 for an aircraft. Position indicating display system 202 includes a moving map display screen 203 that represents of an area of the world being traversed by the aircraft. A current aircraft position indicator 204 is maintained proximate a center of display screen 203 or within a margin 205 of display screen 203. In the exemplary embodiment, margin 205 is displayed for user convenience and is selectable to a non-displayed mode to reduce clutter on screen 203. A width of margin 205 is adjustable by a user. Margin 205 is selectably adjustable to permit keeping current aircraft position indicator 204 closer to the center of display screen 203 or to permit current aircraft position indicator 204 to traverse over a greater area of the display screen. The current aircraft position indicator 204 can be displayed on a north-up oriented map (as exemplarily depicted in FIG. 2) or heading-up oriented moving map display (not shown). In the exemplary embodiment, the area being traversed by the aircraft is the North Atlantic Ocean. The North Atlantic airways are the most heavily utilized oceanic routes in the world. Most routes are conveniently covered by ETOPS-120 min rules however, many of the North Atlantic diversion airports, especially those in Iceland and Greenland, are frequently subject to adverse weather conditions making them unavailable for use at certain times. A first overlay 206 on the moving map display is indicative of a predetermined track of travel, which in the exemplary embodiment, coincides with a North Atlantic Track (NATrack).

North Atlantic Tracks are trans-Atlantic routes that stretch from the northeast of North America to the western coast of Europe across the Atlantic Ocean. These heavily-traveled routes are used by aircraft traveling between the United States, Canada, and Mexico and Europe and are updated daily based on a variety of factors. They are used by aircraft flying between the altitudes of approximately 31,000 and approximately 40,000 feet, inclusive. The tracks reverse direction twice daily. During daylight hours all traffic on the tracks goes westbound. At night, all the tracks go eastbound towards Europe.

The specific routing of the tracks are dictated based on a number of factors, the most important being the jetstream. Aircraft going to North America from Europe experience headwinds caused by the jetstream. Tracks to Europe use the jetstream to their advantage by routing along the strongest tailwinds.

Prior to departure, airline dispatchers will determine the best track based on destination, aircraft weight, and prevailing winds. Once airborne, the Atlantic Track portion of the flight plan will be confirmed. The aircraft will then contact the Oceanic Center controller before entering North Atlantic airspace and inform them of intended track, giving the estimated time of arrival at the entry point. While the route changes daily, a series of entrance and exit waypoints are maintained which link into the airspace system of North America and Europe. Each route is uniquely identified by a letter of the alphabet. Westbound tracks are indicated with a letter from the start of the alphabet (A, B, C, D, and E) and eastbound tracks with a letter from the end (S, T, U, V, W, X, Y).

The moving map display also includes NATracks 208 and 210 that are north and/or south adjacent tracks of predetermined track of travel 206. Current aircraft position indicator 204 is maintained proximate the center or for example, approximately one-third of the display width from the display edge of the moving map display and provides additional information for the cockpit flight crew.

A second overlay 212 appears as a graticule on moving map display 203 that circumscribes the radius in nautical miles or flying time in minutes of the approved area of extended range twin-engine operation (ETOPS) circles which is drawn around each adequate airport and which can be reached by the aircraft in the event that one engine becomes inoperative in accordance to existing regulations for ETOPS operations. As used herein, an adequate airport is an airport certified by the regulatory agencies to meet its safety requirements. A requirement for example is to have rescue and fire fighting services nearby. Second overlay 212 includes a shape that is configurable based on at least one of an aircraft type design approval and an operator approval. The distance is calculated by computing the horizontal distance covered during driftdown (descent to an altitude permitted with one engine inoperative) diversion from a normal cruise altitude at the approved single engine speed to the one engine inoperative cruise altitude following the loss of thrust from one engine. The diversion is continued at this speed and altitude until maximum diversion time is achieved. An adequate airport to divert to in the event of an engine loss must also be considered as suitable. Suitable airports are adequate airports with weather reports or forecasts, or any combination thereof, at the time of flight dispatch, indicating that the weather conditions will be at or above operating minima. A suitable airport also requires that field condition reports indicate a safe landing can be made from approximately one hour prior to approximately one hour after the anticipated time of arrival. As used herein, ETOPS is an acronym for an International Civil Aviation Organization (ICAO) rule permitting twin-engined commercial air transports to fly routes that, at some points, are farther than 60 minutes from a suitable airport during one-engine-out conditions. This definition allows twin-engined airliners to fly long distance routes (especially over water, desert, or remote polar areas) that were previously off-limits to twin-engined aircraft.

In traditional paper charts ETOPS ranges are represented by circles surrounding airports that are candidates for diversion should the twin-engine aircraft lose an engine while traversing a route or track of an organized track system (OTS) such as a NATrack, which leads the aircraft more than 60 minutes from a suitable airport. First overlay 206 is highlighted and must lie within a circular ring of the suitable alternate airport to be approved for ETOPS flight dispatch. Each airport that falls within second overlay 212 is highlighted on the moving map display such that selecting an airport to divert to is facilitated.

In the exemplary embodiment, position indicating display 202 is configured to provide situational awareness information and/or supplementary navigational information for use by the flight crew. Primary navigation means is generally provided by other system such as primary flight displays. However primary navigation functions are envisioned for position indicating display 202 in the future.

The moving map display also includes at least one equal time point (ETP) 214 that indicates a substantially equal travel time from the ETP to alternate facilities capable of receiving the aircraft. As used herein, the ETP represents a point along the route, such as a NATRACK at which the aircraft may either proceed to destination or first suitable airport, or return to departure base or last suitable airport in substantially the same amount of time. An ETP is normally calculated under the assumption of still air.

A transition 216 of controlled airspace into North Atlantic airspace is seamlessly represented on the moving map display such that the pilot does not need to switch between charts to maintain position indication along the route. As the aircraft passes waypoints that indicate controlled airspace the moving map displays additional information representing the flight plan along controlled airspace.

As used herein, extended range operations are those flights conducted over a route that contains a point further than one hour flying time at the approved one-engine inoperative cruise speed (under standard conditions in still air) from an adequate facility capable of receiving the aircraft such as an adequate airport. An extended range entry point (EEP) 218 is the point on the aircraft's outbound route which is one-hour's flying time at the approved single-engine inoperative cruise speed (under standard conditions in still air) from an adequate airport. An extended range exit point (EXP) 220 is the point on the aircraft's route, where the aircraft has been flying in an ETOPS segment which is one-hour's flying time at the approved single-engine inoperative cruise speed (under standard conditions in still air) to an adequate airport.

As used herein, a "critical point" is a point along the route or NATrack being traversed, from which the aircraft can proceed toward the destination or initiate a diversion to another airport. Moving map display screen 203 includes at least one critical point 222 indicating a point along the route at which ETOPS diversion fuel requirements is equal to or greater than a normal destination fuel plan requirement.

Figure 3:
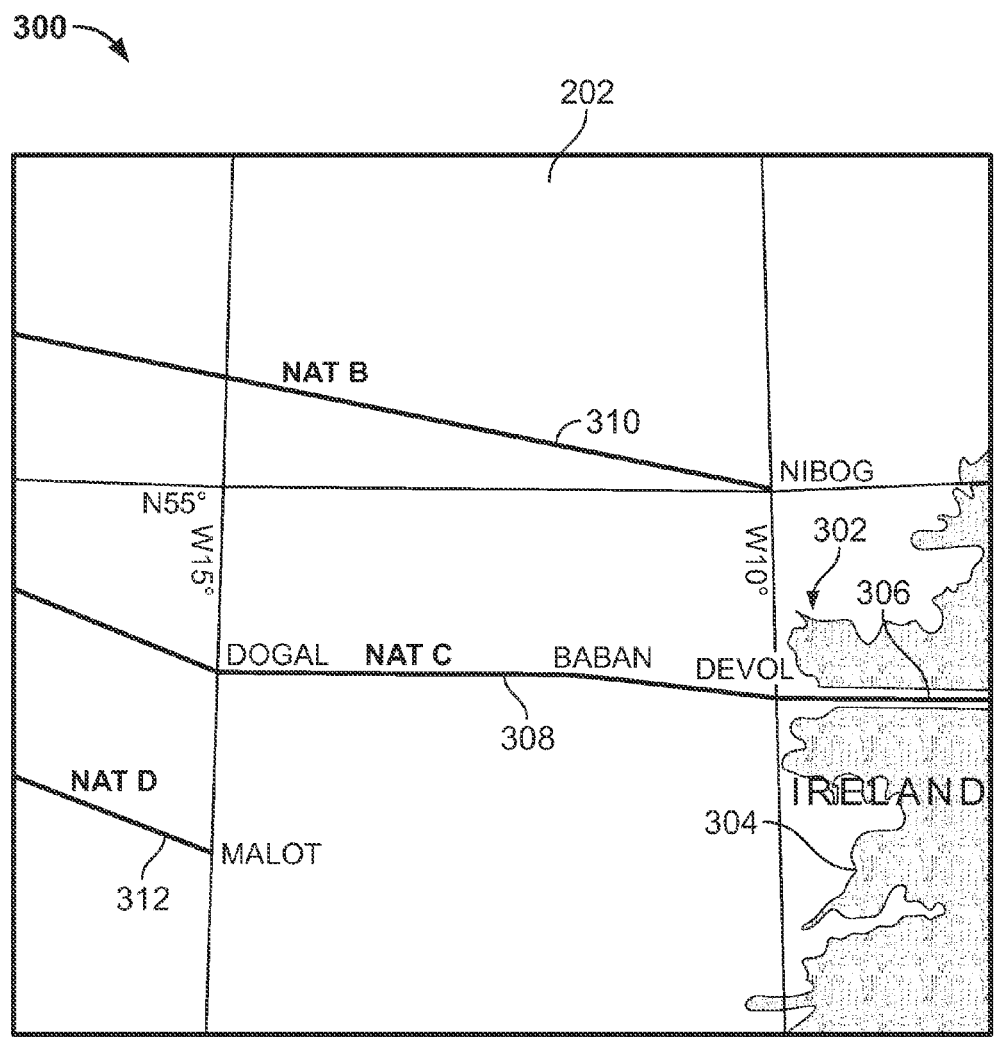
FIG. 3 is a screen shot depicting position indicating display system illustrating a North Atlantic airspace entry point from European airspace.

FIG. 3 is a screen shot 300 depicting position indicating display system 202 illustrating a North Atlantic airspace entry point from European airspace. Position indicating display system 202 includes a moving map display representative of the western coast of Ireland 304. In the exemplary embodiment, a flight plan 306 of an aircraft through European airspace is connected seamlessly to a predetermined NATrack 308 assigned to the aircraft for a North Atlantic airspace transit. Northern and southern NATracks 310 and 312 are also displayed for situational awareness. As the aircraft proceeds along NATrack 308, at a predetermined point, current aircraft position indicator 204 is displayed on the moving map display as described above with reference to FIG. 2.

Figure 4:
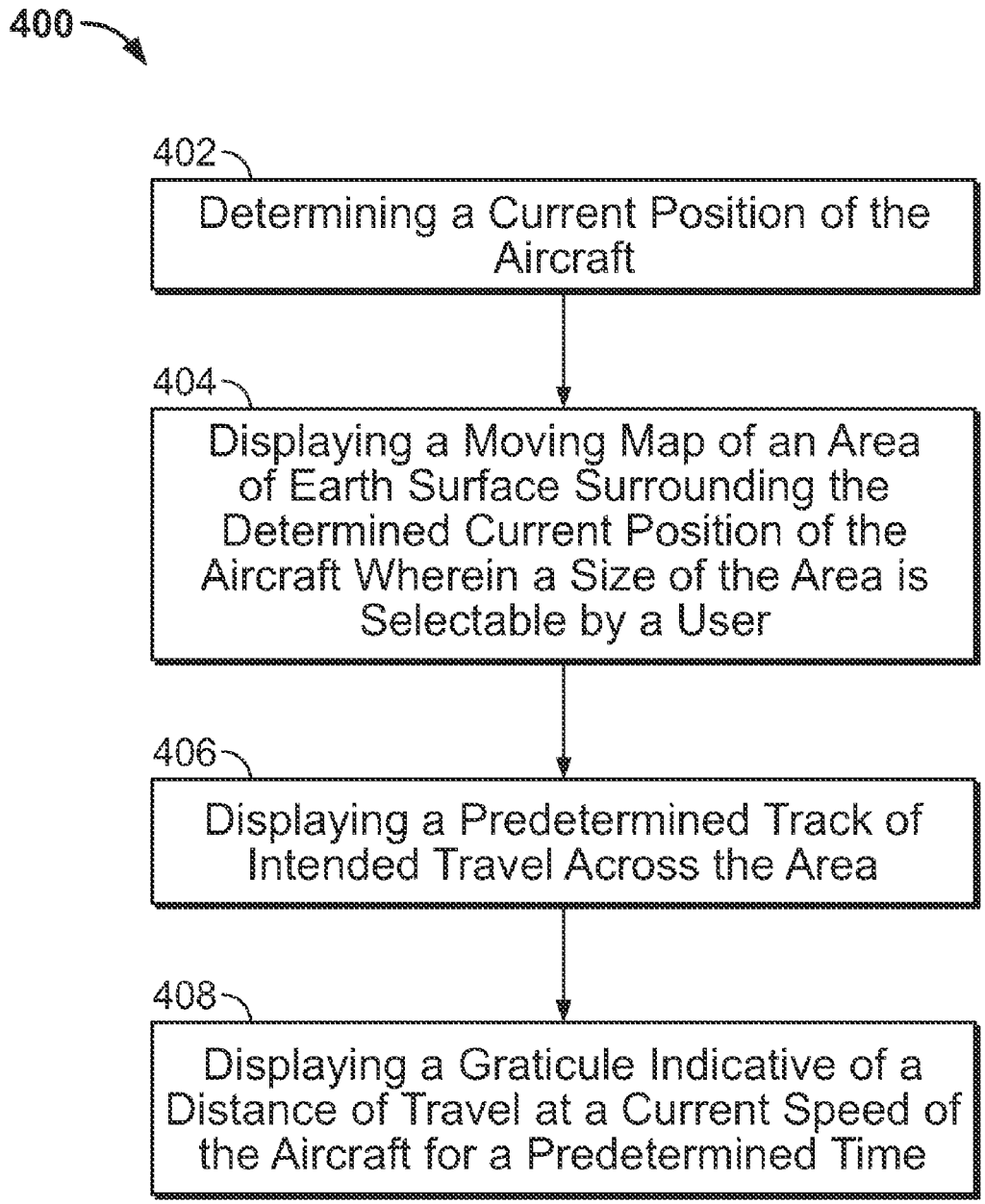
FIG. 4 is a flow chart of an exemplary method of displaying a current position of an aircraft.

FIG. 4 is a flow chart of an exemplary method 400 of displaying a current position of an aircraft. Method 400 includes determining 402 a current position of the aircraft, displaying 404 a moving map of an area of earth surface surrounding the determined current position of the aircraft wherein a size of the area is selectable by a user. The user may zoom in on an area to view the area in closer detail or zoom out to view a larger perspective of the aircraft position. Method 400 also includes displaying 406 a predetermined track of intended travel across the area, and displaying 408 a graticule indicative of a distance of travel at a current speed of the aircraft for a predetermined time.

Method 400 also includes displaying at least one adjacent track to said predetermined track of intended travel. In the exemplary embodiment, the intended track of travel is one NATrack extending across the North Atlantic Ocean. The adjacent tracks are northerly or southerly NATracks that are displayed to provide the flight crew with situational awareness of potential other aircraft in the vicinity of the aircraft. Method 400 determines at least one equal time point (ETP) indicating a substantially equal travel time from the ETP to alternate facilities capable of receiving the aircraft. The ETP clearly indicates to the flight crew through ETP attached arrows which alternate airport to fly to should this become a necessity. The two arrows of an ETP point each in the direction of a suitable alternate airport. The ETP is dynamically determined using current flight route related ETOPS information.

The above-described methods and systems for displaying a current position of an aircraft are cost-effective and highly reliable. A position indicating system includes a moving map display that indicates the current position of an aircraft along a track of intended travel. The tracks may be North Atlantic tracks or other tracks of the organized track system (OTS) or routes over other areas where traditional land-based navigation aids and suitable airports are not readily available. The method facilitates navigation and situation awareness in a cost-effective and reliable manner.

While the invention has been described in terms of various specific embodiments, those skilled in the art will recognize that the invention can be practiced with modification within the spirit and scope of the claims.

What is claimed is:

1. A position indicating display system for an aircraft comprising:
    a moving map display screen representative of an area being traversed by the aircraft such that a current relative position of the aircraft is maintained within a margin of the screen wherein said moving map display is configurable in at least one of a north-up and a heading-up orientation mode;
    a first overlay on the moving map display that is indicative of at least one of a predetermined track of travel and a predetermined route
    a second overlay on the moving map display indicative of a distance range of travel of the aircraft from a facility capable of receiving the aircraft; and
    a third overlay on the moving map display indicative of a time range of travel of the aircraft from the facility, wherein the distance range of travel and the time range of travel are determined using the current rate of travel of the aircraft over the round and a predetermined time period, and wherein said second overlay and said third overlay are alternatively selectable for display on the moving map display.

2. A system in accordance with claim 1 wherein said position indicating display system is configured to provide at least one of situational awareness information and supplementary navigational information.

3. A system in accordance with claim 1 wherein said first overlay is indicative of a North Atlantic Track (NATrack) or another track of an organized track system (OTS).

4. A system in accordance with claim 1 wherein said first overlay comprises a NATrack identifier associated with a respective NATrack or an other track of an organized track system identifier associated with a respective track.

5. A system in accordance with claim 1 wherein said first overlay is indicative of a North Atlantic Track (NATrack) or an other track of the OTS and at least one adjacent NATrack, or adjacent OTS track, respectively.

6. A system in accordance with claim 1 wherein said first overlay comprises at least one equal time point (ETP) indicating a substantially equal travel time from the ETP to alternate facilities capable of receiving the aircraft.

7. A system in accordance with claim 1 wherein said first overlay comprises at least one extended range entry point (EEP) indicating the point on an ETOPS segment where the route becomes greater than approximately one hour flying time at a predetermined one engine inoperative cruise speed from a facility capable of receiving the aircraft wherein the facility capable of receiving the aircraft includes at least one of weather reports and weather forecasts that indicate that the weather conditions will be at or above operating minima and that includes field condition reports that indicate a safe landing can be made from approximately one hour prior to approximately one hour after the anticipated time of arrival.

8. A system in accordance with claim 1 wherein said first overlay comprises at least one extended range exit point (EXP) indicating the point on an ETOPS segment where the route becomes less than one hour flying time at the approved one engine inoperative cruise speed from a facility capable of receiving the aircraft.

9. A system in accordance with claim 1 wherein said first overlay comprises at least one critical point indicating a point along the route at which ETOPS diversion fuel requirements is equal to or greater than a normal destination fuel plan requirement.

10. A system in accordance with claim 1 wherein said second overlay comprises a configurable shape surrounding a representation on the display of a facility capable of receiving the aircraft wherein the configurable circle represents at least one of a distance and a time of travel surrounding a representation on the display of a facility capable of receiving the aircraft for diversion purposes and wherein said shape is configurable based on at least one of an aircraft type design approval and an operator approval.

11. A system in accordance with claim 1 wherein said second overlay is indicative of an extended-range twin-engine operational performance standards (ETOPS).

12. A system in accordance with claim 1 wherein said second overlay includes an indication of a facility capable of receiving the aircraft when the second overlay circumscribes the position of the facility on the moving map display.

13. A system in accordance with claim 1 further comprising a controlled airspace entry point at a first end of the predetermined track of travel.

14. A system in accordance with claim 1 further comprising a controlled airspace exit point at a second opposite end of the predetermined track of travel.

15. A method of displaying a current position of an aircraft comprising:
   determining a current position of the aircraft;
   displaying a moving map of an area of earth surface surrounding the determined current position of the aircraft wherein a size of the area is selectable by a user;
   displaying a predetermined track of intended travel across the area; and
   displaying one of a second overlay and a third overlay on the moving map display, wherein the second overlay is indicative of a distance range of travel of the aircraft from a facility capable of receiving the aircraft, and the third overlay is indicative of a time range of travel of the aircraft from the facility, wherein the distance range of travel and the time range of travel are determined using the current rate of travel of the aircraft over the ground and a predetermined time period wherein the second overlay and the third overlay are alternatively selectable for display on the moving map display, and wherein said moving map display is configurable in at least one of a north-up and a heading-up orientation mode.

16. A method in accordance with claim 15 wherein a size of the area is selectable by a user.

17. A method in accordance with claim 15 wherein displaying a predetermined track of intended travel further comprises displaying at least one adjacent track to said predetermined track of intended travel.

18. A method in accordance with claim 15 further comprising displaying at least one equal time point (ETP) indicating a substantially equal travel time from the ETP to alternate facilities capable of receiving the aircraft.

19. An electronic flight bag system including a moving map display comprising:
   a first overlay displayed on the moving map display indicative of an intended track of travel
   a second overlay displayed on the moving map display indicative of a current position of the aircraft and further indicative of a distance range of travel of the aircraft with respect to a position of a plurality of facilities capable of receiving the aircraft; and
   a third overlay displayed in the moving map display indicative of the current position of the aircraft and further indicative of a time range of travel of the aircraft with respect to the position of the plurality of facilities wherein the distance range of travel and the time range of travel are determined using the current rate of travel of the aircraft over the ground and a predetermined time, and wherein said second overlay and said third overlay are alternatively selectable for display on the moving map display.

20. An electronic flight bag system in accordance with claim 19 wherein said moving map display further comprises an indication of the current position of an aircraft displayed on the moving map display.

21. An electronic flight bag system in accordance with claim 20 wherein said indication of the current position of an aircraft is maintained within a margin of the screen proximate a center of the moving map display.

22. An electronic flight bag system in accordance with claim 19 wherein said intended track of travel is at least one of a route, a North Atlantic Track (NATrack), and another track of an organized track System (OTS).

* * * * *